United States Patent [19]

Kruschwitz

[11] 4,347,693
[45] Sep. 7, 1982

[54] WINDOW GLASS MOUNTING ARRANGEMENTS

[75] Inventor: Werner Kruschwitz, Viersen, Fed. Rep. of Germany

[73] Assignee: Draftex Development, AG, Zug, Switzerland

[21] Appl. No.: 183,141

[22] Filed: Sep. 2, 1980

[30] Foreign Application Priority Data

Oct. 4, 1979 [GB] United Kingdom ................ 7934471

[51] Int. Cl.³ .......................... E06B 3/62; E06B 7/16
[52] U.S. Cl. ...................................... 52/208; 52/400; 52/716
[58] Field of Search .......................... 52/208, 400, 716

[56] References Cited

U.S. PATENT DOCUMENTS

| | | | |
|---|---|---|---|
| 3,150,421 | 9/1964 | Lickert | 52/208 |
| 3,189,143 | 6/1965 | Adams | 52/400 X |
| 3,474,586 | 10/1969 | Hoverman, Jr. | 52/400 |
| 3,815,303 | 6/1974 | Ziegler | 52/400 X |
| 4,001,994 | 1/1977 | Williams | 52/461 X |
| 4,271,634 | 6/1981 | Andrzejewski | 52/76 X |

FOREIGN PATENT DOCUMENTS

| | | |
|---|---|---|
| 1315616 | 5/1973 | United Kingdom . |
| 1512841 | 6/1978 | United Kingdom . |
| 2031499 | 4/1980 | United Kingdom . |

*Primary Examiner*—Alfred C. Perham
*Attorney, Agent, or Firm*—Leydig, Voit, Osann, Mayer & Holt, Ltd.

[57] ABSTRACT

A windscreen mounting arrangement comprises a first part made of plastics materials in which is embedded a reinforcing metal carrier and defining a first channel, and a second part made of rubber and also defining a channel. The part has, running alongside its channel, a longitudinal slot whose mouth faces in the same direction as the channel of that part and whose walls and base are reinforced with an embedded metal carrier. The two parts are fitted together so that one side wall of the first part fits tightly into and is secured within the slot of the second part. This produces first and second channels running side-by-side and facing in opposite directions. One of these channels fits over and grips a flange surrounding the window opening so that the other channel runs alongside the window opening for receiving the window glass.

7 Claims, 4 Drawing Figures

WINDOW GLASS MOUNTING ARRANGEMENTS

BACKGROUND OF THE INVENTION

The invention relates to mounting arrangements for mounting window glass, such as, for example, for mounting motor vehicle windscreens.

BRIEF SUMMARY OF THE INVENTION

According to the invention, there is provided a window glass mounting arrangement, comprising two separate parts assembled together to define first and second longitudinally extending channels substantially side-by-side and facing in opposite directions, the first channel being sized to fit over and grip a support member surrounding the window opening so that the second channel then runs along the window opening for receiving the window glass, the first part being made of plastics material, the second part being made of rubber material, one said part having walls and a base defining a longitudinally extending slot, a channel-shaped metal reinforcing carrier embedded in the walls and base defining the said slot, and the other said part defining a longitudinally extending portion which is fitted tightly within the slot and secures the two parts together.

According to the invention, there is also provided a window glass mounting arrangement, comprising a first channel-shaped portion made of plastics material, a reinforcing channel-shaped metal carrier embedded in the plastics material, a second channel-shaped part made of rubber having walls and a base defining, running alongside its channel, a longitudinal slot whose mouth faces in the same direction as the channel of that part, and a second metal carrier embedded in the walls and base of the said slot, the two parts being fitted together so that one side wall of the first part fits tightly into and is frictionally secured within the slot of the second part, the two parts thereby together defining first and second channels running side-by-side and facing in opposite directions with the outside wall of the first channel being defined by the first part and the outside wall of the second channel being defined by the second part, the first channel being sized to fit over and grip a support member surrounding the window opening so that the second channel runs alongside the window opening for receiving the window glass.

DESCRIPTION OF THE DRAWINGS

Mounting arrangements embodying the invention, for mounting a motor vehicle windscreen or windshield in a vehicle body, will now be described by way of example only, with reference to the accompanying diagrammatic drawings, in which.

DESCRIPTION OF PREFERRED EMBODIMENTS

Figure 1:
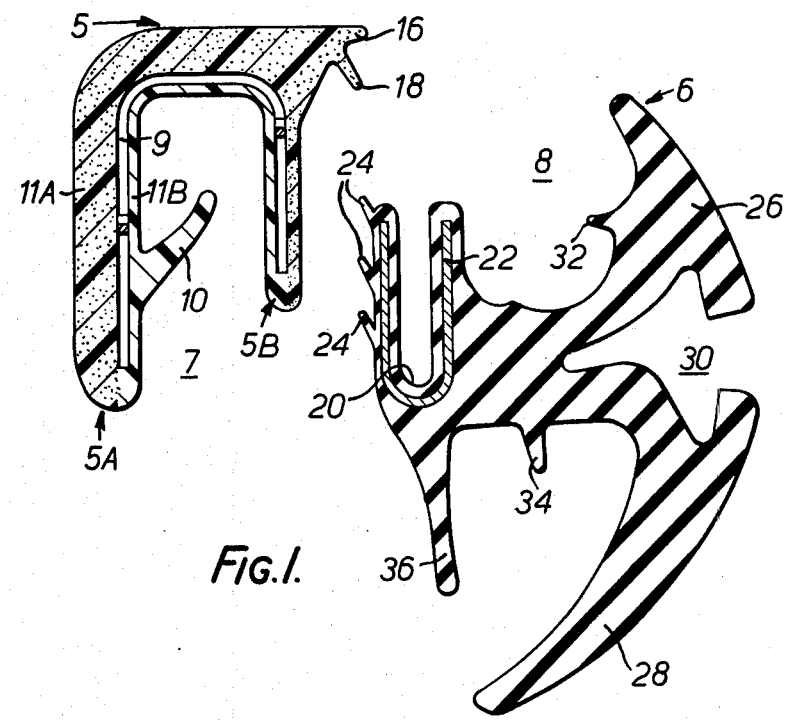
FIG. 1 is an exploded view of the arrangement in cross-section.

The mounting arrangement is made up of two separate channel-shaped parts 5 and 6. The part 5 comprises plastics material reinforced with a channel-shaped metal carrier 9. The part 5 is reinforced by extruding the plastics material over the carrier 9 and the plastics material defines an integrally longitudinally extending gripping rib 10. The plastics material may be in the form of a foamed plastics outer part 11A and a solid or unfoamed inner part 11B defining the rib 10, the two parts 11A and 11B being extruded together and integral. One side wall 5A of the channel defined by the part 5 is thicker and longer than the other side wall 5B, and this other side wall is shaped to define two smaller longitudinally extending ribs 16 and 18.

The metal carrier 9 may take any suitable form so as to provide longitudinal flexibility for the part 5. It may, for example, comprise a series of generally U-shaped metal elements whic are arranged side-by-side and spaced apart to define the channel. Each element may be connected to the adjacent element by one or more short flexible connecting links. Instead, however, it may be separate from the adjacent element.

Figure 2:
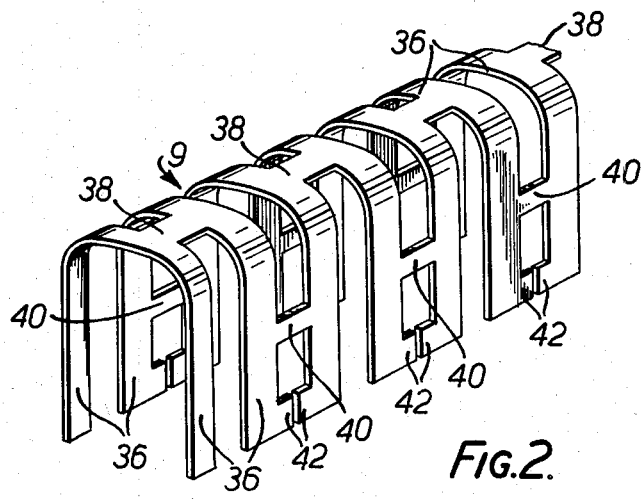
FIG. 2 is a perspective view of a carrier which may be used in the arrangement of FIG. 1.

FIG. 2 shows in more detail one form which the metal carrier 9 can take.

As shown in FIG. 2, the metal carrier 9 comprises a series of generally U-shaped metal elements 36 which are arranged side-by-side and spaced apart to define a channel. Each element 36 is connected to the adjacent element 36 on one side by only a single connecting link 38, this connecting link 38 connecting the bases of the respective elements 36 together. Each element 36 is connected to the adjacent element 36 on its other side by two connecting links 40, each connecting link 40 connecting an intermediate point one one of the legs of that element to an intermediate point on the corresponding leg of the adjacent element on that side.

In addition, the distal end of each leg which is connected to an adjacent leg by one of the connecting links 40 carries an extension 42 which terminates immediately adjacent to a corresponding extension 42 on the corresponding leg, and may in fact abut it.

The carrier is preferably made of metal and the connecting links 38 and 40, and the extensions 42 are preferably integral with the elements 36.

The carrier 9 described in FIG. 2 is advantageous in that it permits some limited lengthwise compression of the mounting arrangement but resists stretching. Stretching is resisted because the extensions 42 prevent or limit the extent of possible movement towards each other of the distal ends of the legs of the alternate pairs of the elements 36. When longitudinal pull is applied to the carrier, the legs which are connected together by the links 40 tend to pivot on the links so as to tend to move the distal ends of both legs together, and by resisting this movement of the distal ends of those legs, the extensions 42 prevent or limit the stretching of the carrier and thus of the complete strip.

Another form which the carrier can take comprises a series of U-shaped elements which are connected together by connecting links interconnecting their legs. Each connecting link is inclined to the direction of extension of the legs which it interconnects. In addition, a flexible substantially inextensible tape member runs along the length of the carrier on the inside of the channel shape defined by the carrier. The flexible substantially inextensible tape member may be made of any suitable material, such as a suitable synthetic material. It may comprise glass fibre threads, for example.

In another form (not illustrated), the carrier may comprise looped metal wire arranged to define a channel. If desired, one or more flexible substantially inextensible threads can run along the length of the carrier and be, for example, looped around the wire so as to resist stretching of the carrier.

The part 6 of the mounting arrangement is made of extruded solid rubber which defines a relatively narrow channel or slot 20 which is reinforced by an embedded metal carrier 22 which may be of the same form as the carrier 9 in the part 5. The rubber defining one wall of the slot 20 may be arranged to define relatively small longitudinally extending ribs 24.

In addition the part 6 has upper and lower tongues 26 and 28 which define between them a groove 30. The part 6 also has smaller longitudinally extending lips 32, 34 and 36.

Figure 3:
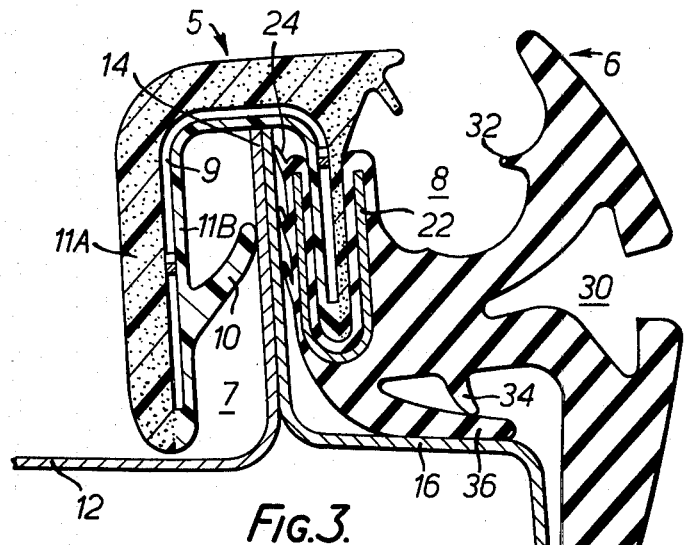
FIG. 3 is a cross-sectional view of the assembled arrangement after mounting on a retaining flange of the vehicle.

FIG. 3 shows how the parts 5 and 6 of FIG. 1 are assembled together with the shorter and narrower side wall 5B of the part 5 inserted into the slot 20 which firmly grips and retains it so as to hold the two parts together in the manner shown. In this way, they define respective channels 7 and 8 facing in generally opposite directions. Each channel 7, 8 is defined partly by a portion of the part 5 and partly by a portion of the part 6.

In order to increase the strength with which the parts 5 and 6 are held together, the outer surface of the wall 5B of the part 5 may be provided with serrations or the like which mechanically interlock with corresponding formations on the inside wall of the slot 20. Instead, or in addition, the wall 5B may be adhesively secured within the slot 20.

In use, and as shown in FIG. 3, the mounting arrangement is fitted onto a motor vehicle body 12 so that the channel 7 is placed over, and grips, the opposite sides of, a flange 14 which forms part of the vehicle bodywork and runs around the windscreen opening. When the mounting arrangement is mounted in this way, the part 6 therefore lies alongside the flange 14 but outside the windscreen opening, and rests, in this example, on a part 16 of the vehicle body.

Figure 4:
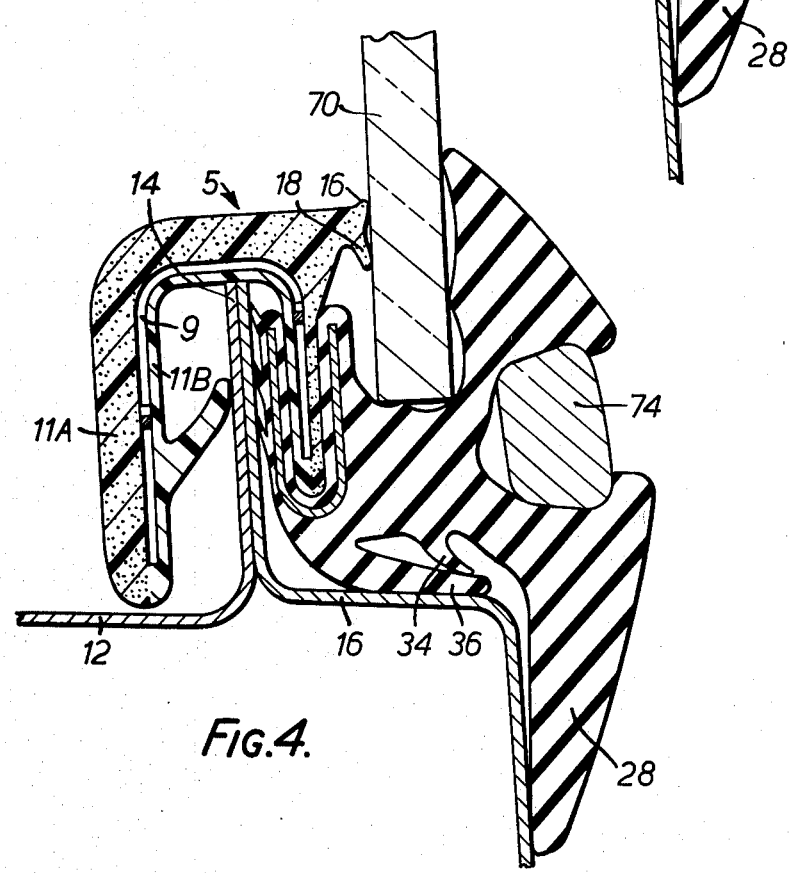
FIG. 4 corresponds to FIG. 3 but shows a final stage in the process of fitting the windscreen in the arrangement.

A windscreen glass 70 is fitted into and secured in the mounting arrangement (as shown in FIG. 4) by placing the peripheral edge of the glass in the channel 8 after bending outwards the tongue 26 (if necessary, this process may be assisted by placing a cord or wire in the base of the channel 8 around the complete periphery of the windscreen opening and then pulling outwards, the cord being removed when the glass is seated in the channel, to allow the tongue 26 to resile). A stiffening strip 74, made of metal, for example, is then inserted into the groove 30. The stiffening strip runs around the entire windscreen opening and holds the windscreen glass 70 against dropping out either forwardly or rearwardly of the opening.

The arrangement illustrated is advantageous because the part 5, being made of plastics material, can more easily be coloured or decorated to give a pleasing appearance, while the part 6 remains strong enough to hold the windscreen glass in position. Furthermore, the fact that the two parts are made separately and can then be firmly secured together by virtue of the presence of the carrier 22 around the slot 20 in the part 6 enables the material of each part to be treated appropriately without damaging the material of the other. Thus, the rubber of the part 6 can be vulcanized without risk of damaging the plastics material of the part 5 because the vulcanization can take place before assembly of the two parts.

The designs of the carrier 9 referred to above are advantageous because they have the ability to resist stretching. The ability to resist stretching is important because the mounting arrangement may be subjected to longitudinal tension during or immediately after manufacture, for example before it is formed into a closed ring or while it is being prepared for fitting onto, or actually being fitted onto the vehicle bodywork. If stretching could take place, then subsequent resiling of the mounting arrangement would cause it to be ill fitting.

The ability of the carriers described to undergo some compression is advantageous because it enables the mounting arrangement to be produced with such peripheral length that it has to be compressed lengthwise to a limited extent before fitting the part 5 onto the flange 14 (and the arrangement may in fact be slightly oversized for this purpose). This enables it to take up tolerances in the size of the windscreen opening, and enables the windscreen glass 70 to "float" to at least a slight extent in the part 6 when finally fitted. This better enables the windscreen glass to absorb shocks and strain due to slight movement of the bodywork that may take place in use of the vehicle. Another important advantage of compressibility is that it offsets to a considerable extent the tension which may be generated in the plastics or rubber material when the mounting arrangement is curved to fit the corners or bends in the flange 14 at the corners or bends of the windscreen opening; when the covering material is rubber, it is particularly important to reduce the generation of such tension to the rubber because it accelerates the ageing process in the rubber and could cause the rubber to crack.

However, other forms of carrier may be used instead.

What is claimed is:

1. A window glass mounting arrangement, comprising two separate parts assembled together to define first and second longitudinally extending channels substantially side-by-side and facing in opposite directions, the first channel being sized to fit over and grip a support member surrounding and on one side of the window opening so that the second channel then runs along the window opening for receiving the window glass, the first part being made of plastics material, the second part being made of rubber material, one said part including a first longitudinally extending portion which forms at least a component of one of the side walls of one of the channels and which has formed within it a longitudinally extending slot having walls and a base defined in the said portion, a channel-shaped metal reinforcing carrier which is embedded in the walls and base defining the said slot and which embraces the said slot, and the other said part defining another longitudinally extending portion which is fitted tightly within the slot and secures the two parts together, the second part being completely free of embedded inseparable metal reinforcement on the opposite side of the window opening to the said one side.

2. An arrangement according to claim 1, in which the said first part has walls and a base defining a channel-shape which forms at least part of one of the said channels and the said other portion is one side wall of this channel-shape.

3. An arrangement according to claim 2, including a reinforcing metal carrier embedded in the walls and base defining the said channel-shape.

4. An arrangement according to claim 2, in which the said first channel is defined partly by the other side wall of the channel-shape of the first part and the outside of one of the said walls of the said slot.

5. An arrangement according to claim 1, in which the opposite sides of the first channel carry longitudinally extending gripping ribs for frictionally gripping the support member surrounding the window opening.

6. An arrangement according to claim 1, in which the said second part defines a groove on the opposite side of the window opening to the said one side, and including a stiffening member separate from but receivable in the said groove so as to stiffen the rubber material to secure the window glass in the second channel.

7. A window glass mounting arrangement, comprising a first channel-shaped part made of plastics material, a first reinforcing channel-shaped metal carrier embedded in the plastics material so as to embrace the channel formed by the channel-shape thereof, a second channel-shaped part made of rubber having walls and a base defining, running alongside the channel formed by its channel-shape, a longitudinal slot whose mouth faces in the same direction as the channel formed by its channel-shape, and a second reinforcing channel-shaped metal carrier embedded in the walls and base of the said slot so as to embrace the slot, the two parts being fitted together so that one side wall of the channel of the first part fits tightly into and is frictionally secured within the said slot of the second part, the two parts thereby together defining first and second channels running side-by-side and facing in opposite directions with the outside wall of the first channel being defined by the first part and the outside wall of the second channel being defined by the second part, the first channel being sized to fit over and grip a support member surrounding the window opening so that the second channel runs alongside the window opening for receiving the window glass, the outside wall of the second channel being completely free of any embedded and inseparable metal reinforcement but defining a groove, and including a removable stiffening member separate from but receivable in the groove so as to stiffen that wall and thereby to secure the window glass in the second channel.

* * * * *